United States Patent
Johnson et al.

(10) Patent No.: US 10,690,111 B2
(45) Date of Patent: Jun. 23, 2020

(54) WIND TURBINE ROTOR BLADE

(71) Applicant: General Electric Company, Schenectady, NY (US)

(72) Inventors: Stephen Bertram Johnson, Greenville, SC (US); Anne Parsons Kyriakides, Kirkland, WA (US)

(73) Assignee: General Electric Company, Schenectady, NY (US)

( * ) Notice: Subject to any disclaimer, the term of this patent is extended or adjusted under 35 U.S.C. 154(b) by 258 days.

(21) Appl. No.: 15/367,472

(22) Filed: Dec. 2, 2016

(65) Prior Publication Data

US 2018/0156190 A1    Jun. 7, 2018

(51) Int. Cl.
 *F03D 1/06* (2006.01)

(52) U.S. Cl.
 CPC ........ *F03D 1/0675* (2013.01); *F05B 2240/21* (2013.01); *F05B 2250/11* (2013.01); *F05B 2280/6012* (2013.01); *Y02E 10/721* (2013.01)

(58) Field of Classification Search
 CPC . F03D 1/0675; F05B 2250/01; F05B 2250/11
 See application file for complete search history.

(56) References Cited

U.S. PATENT DOCUMENTS

| | | | |
|---|---|---|---|
| 3,771,612 A | 11/1973 | Adcock | |
| 3,924,839 A | 12/1975 | Millauer | |
| 3,937,123 A | 2/1976 | Matuschek et al. | |
| 3,959,544 A | 5/1976 | Rogers | |
| 4,162,777 A | 7/1979 | Gilbert, III et al. | |
| 4,198,018 A | 4/1980 | Brault | |
| 4,295,790 A * | 10/1981 | Eggert, Jr. | F03D 1/0675 416/226 |
| 4,546,838 A | 10/1985 | Ormond | |
| 4,920,842 A | 5/1990 | Orlicki et al. | |
| 5,027,872 A | 7/1991 | Taylor et al. | |
| 5,064,705 A | 11/1991 | Donovan, Sr. | |
| 5,079,121 A | 1/1992 | Facci et al. | |
| 5,129,787 A | 7/1992 | Violette et al. | |
| 5,461,933 A | 10/1995 | Ives et al. | |
| 5,472,290 A | 12/1995 | Hulls | |
| 5,511,677 A | 4/1996 | Oder | |
| 6,596,949 B2 | 7/2003 | Stimpson | |
| 6,976,829 B2 | 12/2005 | Kovalsky et al. | |
| 7,470,114 B2 | 12/2008 | Bonnet | |
| 7,686,249 B2 | 3/2010 | Luttig et al. | |
| 7,841,835 B2 | 11/2010 | Bagepalli et al. | |
| 7,854,595 B2 | 12/2010 | Kinzie et al. | |

(Continued)

FOREIGN PATENT DOCUMENTS

| | | |
|---|---|---|
| EP | 0457580 A1 | 11/1991 |
| EP | 0728858 A1 | 8/1996 |

*Primary Examiner* — Kenneth J Hansen
*Assistant Examiner* — Andrew J Marien
(74) *Attorney, Agent, or Firm* — Dority & Manning, P.A.

(57) ABSTRACT

The present disclosure is directed to a rotor blade that includes a shell defining an interior cavity. The rotor blade also includes exterior surfaces defining a pressure side, a suction side, a leading edge, and a trailing edge. Each of the pressure side, the suction side, the leading edge, and the trailing edge extends between a tip and a root. The shell defines a span and a chord. A shear web is positioned in the interior cavity and coupled to the shell. The shear web includes a lattice structure.

17 Claims, 6 Drawing Sheets

(56) References Cited

U.S. PATENT DOCUMENTS

| | | |
|---|---|---|
| 7,857,595 B2 | 12/2010 | Wambeke et al. |
| 7,866,951 B2 | 1/2011 | Kavala |
| 7,895,745 B2 | 3/2011 | Althoff et al. |
| 7,922,454 B1 | 4/2011 | Riddell |
| 8,075,275 B2 * | 12/2011 | Althoff ................. F03D 1/0675 29/889.7 |
| 8,075,278 B2 | 12/2011 | Zuteck |
| 8,192,169 B2 | 6/2012 | Piasecki |
| 8,235,671 B2 | 8/2012 | Yarbrough |
| 8,257,048 B2 | 9/2012 | Yarbrough |
| 8,262,362 B2 | 9/2012 | Yarbrough |
| 8,272,687 B2 | 9/2012 | Gross et al. |
| 2003/0042050 A1 | 3/2003 | Stimpson |
| 2003/0116262 A1 * | 6/2003 | Stiesdal ................. B29C 70/443 156/245 |
| 2005/0013694 A1 | 1/2005 | Kovalsky et al. |
| 2006/0237587 A1 | 10/2006 | Luttig et al. |
| 2007/0041829 A1 | 2/2007 | Bonnet |
| 2008/0219851 A1 | 9/2008 | Althoff et al. |
| 2009/0087318 A1 | 4/2009 | Althoff et al. |
| 2009/0196755 A1 * | 8/2009 | Peace ................. F03D 1/0675 416/226 |
| 2010/0008789 A1 * | 1/2010 | Jensen ................. F03D 1/0675 416/233 |
| 2010/0028157 A1 | 2/2010 | Kinzie et al. |
| 2010/0054950 A1 | 3/2010 | Rao Kavala |
| 2010/0068498 A1 | 3/2010 | Wambeke et al. |
| 2010/0135815 A1 * | 6/2010 | Bagepalli ............. F03D 1/0675 416/226 |
| 2010/0209237 A1 | 8/2010 | Cooper et al. |
| 2010/0296940 A1 | 11/2010 | Zuteck |
| 2011/0008175 A1 * | 1/2011 | Gau ................. F03D 1/0675 416/233 |
| 2011/0126978 A1 | 6/2011 | Gau |
| 2011/0142669 A1 | 6/2011 | Althoff et al. |
| 2011/0176928 A1 * | 7/2011 | Jensen ................. F03D 1/0675 416/233 |
| 2011/0187115 A1 | 8/2011 | Piasecki |
| 2011/0229333 A1 | 9/2011 | Flach |
| 2012/0027610 A1 * | 2/2012 | Yarbrough ............ F03D 1/0683 416/226 |
| 2012/0027612 A1 | 2/2012 | Yarbrough |
| 2012/0027613 A1 * | 2/2012 | Yarbrough ............. F03D 1/065 416/226 |
| 2012/0027614 A1 | 2/2012 | Yarbrough |
| 2012/0033207 A1 | 2/2012 | Faidi et al. |
| 2012/0174401 A1 | 7/2012 | Piasecki |
| 2012/0180582 A1 | 7/2012 | Piasecki |
| 2012/0255669 A1 | 10/2012 | Catsman et al. |
| 2013/0183161 A1 * | 7/2013 | Richtman ............. F03D 1/0675 416/232 |
| 2014/0334930 A1 * | 11/2014 | Rob ..................... F03D 1/0633 416/147 |
| 2015/0308404 A1 * | 10/2015 | Dahl ..................... F03D 13/10 416/230 |
| 2015/0316028 A1 * | 11/2015 | Brekenfeld ........... F03D 1/0675 416/229 R |
| 2017/0021575 A1 * | 1/2017 | Hansen ................. F03D 1/0675 |
| 2017/0030330 A1 * | 2/2017 | Caruso ................. F03D 1/065 |
| 2017/0050372 A1 * | 2/2017 | Nielsen ................. B29C 65/48 |
| 2017/0241401 A1 * | 8/2017 | Smith ................. B29C 66/324 |

* cited by examiner

WIND TURBINE ROTOR BLADE

FIELD OF THE TECHNOLOGY

The present disclosure generally relates to wind turbines. More particularly, the present disclosure relates to rotor blades for wind turbines.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and one or more rotor blades. The one or more rotor blades convert kinetic energy of wind into mechanical energy using known airfoil principles. A shaft transmits the mechanical energy from the rotor blades to the generator. The generator then converts the mechanical energy to electrical energy that may be supplied to a utility grid.

Each rotor blade is generally formed from a plurality of shell portions that are bonded together to form the exterior aerodynamic shape of the rotor blade. In this respect, the shell portions define an interior cavity within the rotor blade. One or more structural components, such as one or more shear webs, may be positioned within the interior cavity. In particular, the structural components engage the shell portions to increase the stiffness, buckling resistance, and/or strength of the rotor blade.

Conventional shear webs are expensive to manufacture. More specifically, conventional shear webs are typically formed by laying a reinforcing material, such as glass fiber, in a purpose-built mold. Pre-cut foam core is then placed in the mold on top of the reinforcing material. Additional reinforcing material is placed over the pre-cut foam core. The mold is then bagged so that the reinforcing material may be infused with a suitable resin. After infusion, the shear web is cured. The time-consuming nature of this process results in a relatively high cost to produce the shear webs and, in turn, the rotor blades.

Accordingly, improved wind turbines, and, in particular, improved shear webs for wind turbine rotor blades, are desired in the art. Specifically, shear webs that do not require the use of a time consuming manufacturing process and that are relatively less expensive to manufacture would be advantageous.

BRIEF DESCRIPTION OF THE TECHNOLOGY

Aspects and advantages of the technology will be set forth in part in the following description, or may be obvious from the description, or may be learned through practice of the technology.

In one embodiment, the present disclosure is directed to a rotor blade that includes a shell defining an interior cavity. The rotor blade also includes exterior surfaces defining a pressure side, a suction side, a leading edge, and a trailing edge. Each of the pressure side, the suction side, the leading edge, and the trailing edge extends between a tip and a root. The shell defines a span and a chord. A shear web is positioned in the interior cavity and coupled to the shell. The shear web includes a lattice structure.

In another embodiment, the present disclosure is directed to a rotor blade that includes a shell defining an interior cavity. The rotor blade also includes exterior surfaces defining a pressure side, a suction side, a leading edge, and a trailing edge. Each of the pressure side, the suction side, the leading edge, and the trailing edge extends between a tip and a root. The shell defines a span and a chord. A first cap is positioned in the interior cavity and coupled to a portion of the shell defining the pressure side. A second cap is positioned in the interior cavity and coupled to a portion of the shell defining the suction side. A shear web is positioned in the interior cavity. The shear web includes a first side, a second side spaced apart from the first side, and a lattice structure. The first side of the shear web couples to the first cap, and the second side of the shear web couples to the second cap.

In another embodiment, the present disclosure is directed to a wind turbine that includes a tower, a nacelle mounted on the tower, a rotor coupled to the nacelle. The rotor includes a hub and at least one rotor blade extending outward from the hub. Each rotor blade includes a shell defining an interior cavity and exterior surfaces defining a pressure side, a suction side, a leading edge, and a trailing edge. Each of the pressure side, the suction side, the leading edge, and the trailing edge extends between a tip and a root. The shell defines a span and a chord. A shear web is positioned in the interior cavity and coupled to the shell. The shear web comprises a lattice structure.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended FIGS., in which.

Figure 1:
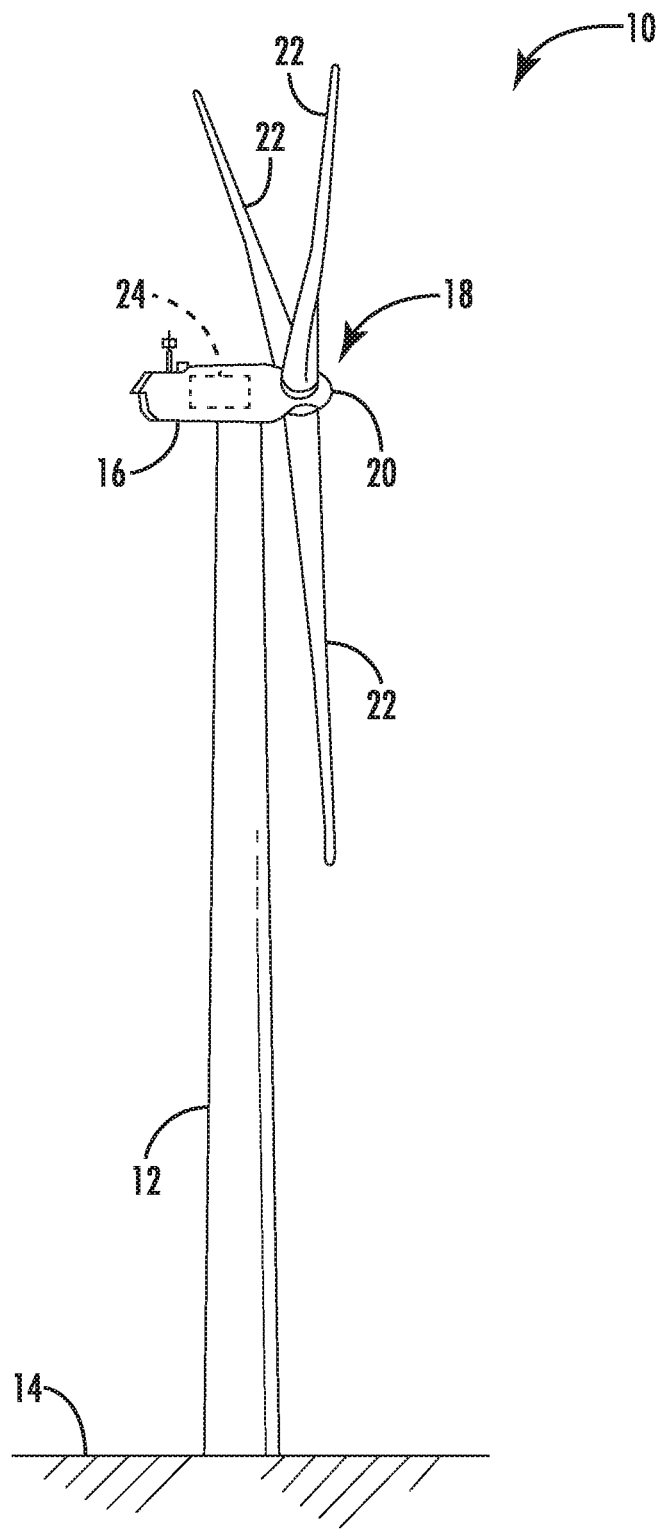
FIG. 1 is a perspective view of an exemplary wind turbine in accordance with embodiments of the present disclosure.

Repeat use of reference characters in the present specification and drawings is intended to represent the same or analogous features or elements of the present technology.

DETAILED DESCRIPTION OF THE TECHNOLOGY

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Referring now to the drawings, FIG. 1 illustrates a perspective view of one embodiment of an exemplary wind turbine 10 in accordance with the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotating the rotor 18 to convert kinetic energy from the wind into usable mechanical energy, and subsequently, electrical energy. For instance, the hub 20 may be rotatably coupled to an electric generator 24 positioned within the nacelle 16.

Figure 2:
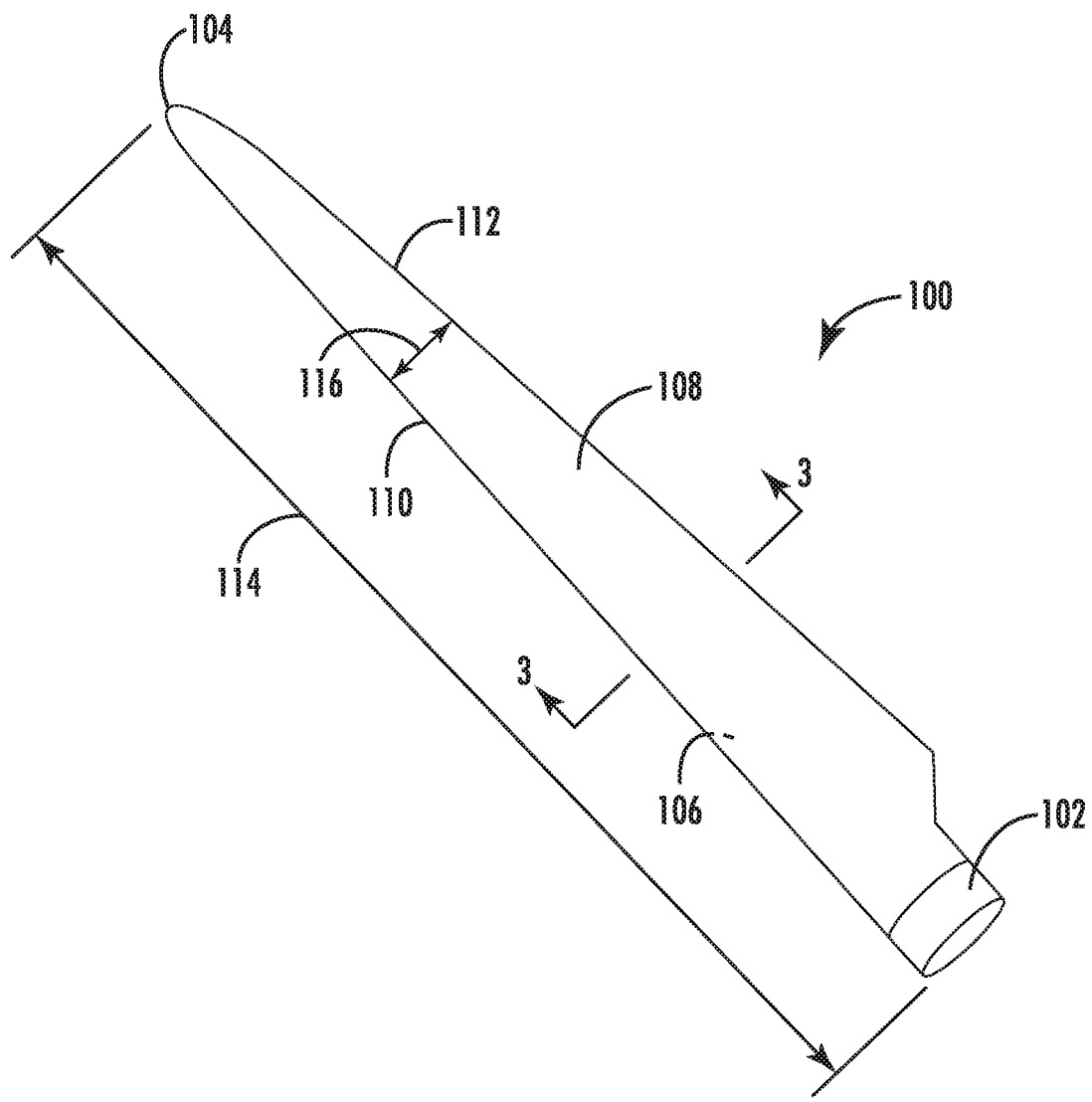
FIG. 2 is a perspective view of an exemplary rotor blade in accordance with embodiments of the present disclosure.

FIG. 2 is a perspective view of a rotor blade 100, which may be incorporated into the wind turbine 10 in place of or in addition to the rotor blade 22. As shown, the rotor blade 100 includes a blade root 102 that couples to the rotatable hub 20 (FIG. 1) and a blade tip 104 disposed opposite the blade root 102. The rotor blade 100 may also include a pressure side 106 and a suction side 108 extending between a leading edge 110 and a trailing edge 112. Additionally, the rotor blade 100 may include a span 114 defining the total length between the blade root 102 and the blade tip 104 and a chord 116 defining the total length between the leading edge 110 and the trailing edge 112. In general, the chord 116 may vary in length along the span 114 as the rotor blade 100 extends from the blade root 102 to the blade tip 104.

Figure 3:
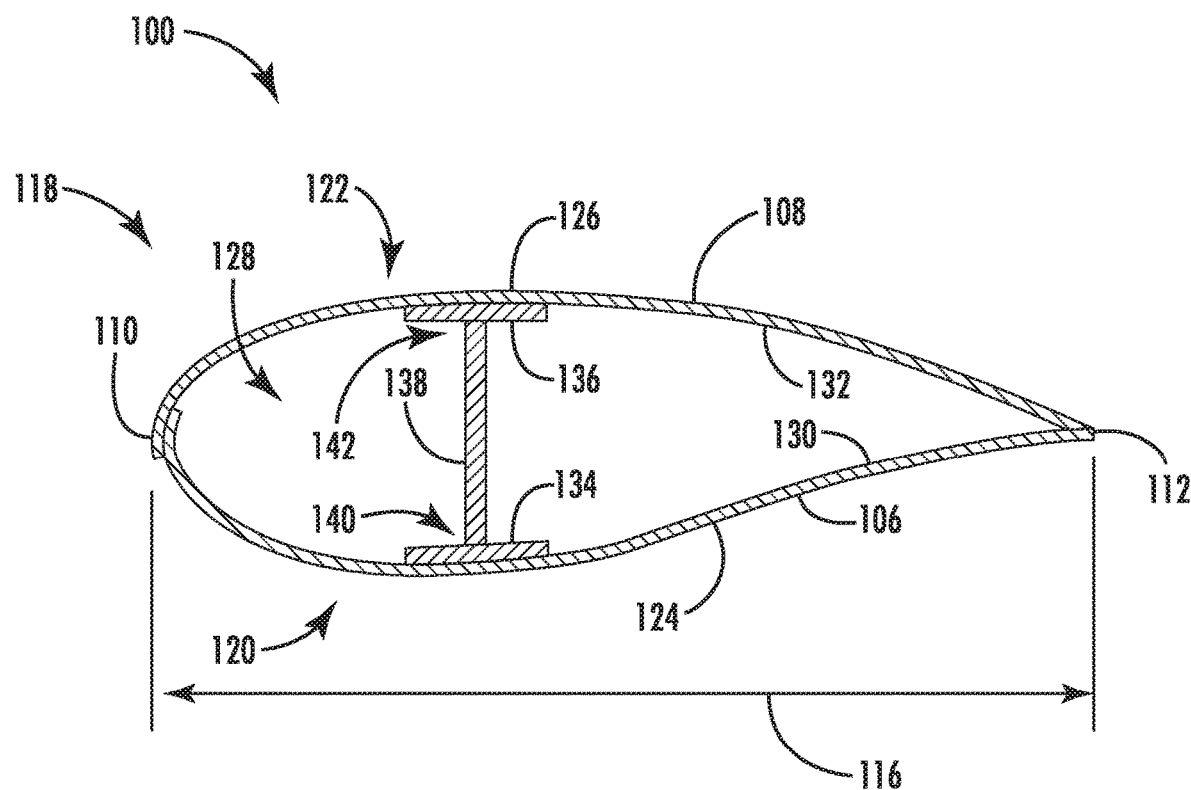
FIG. 3 is a cross-sectional view of the rotor blade taken generally about line 3-3 shown in FIG. 2, illustrating a shear web positioned within the rotor blade in accordance with embodiments of the present disclosure.

Referring now to FIG. 3, the rotor blade 100 is formed from a shell 118. In some embodiments, the shell 118 includes a first shell portion 120 and a second shell portion 122 coupled (e.g., adhesively coupled) at or proximate to the leading edge 110 and the trailing edge 112 of the rotor blade 100. In this respect, the first and second shell portions 120, 122 may extend along the entire span 114 and/or the entire chord 116. In alternate embodiments, however, the shell 118 may include more or fewer shell portions and/or the shell portions may be joined at different positions on the rotor blade 100. Furthermore, each shell portion may in some embodiments extend for only a portion of the span 114 and/or the chord 116.

As shown in FIG. 3, the shell 118 includes exterior surfaces defining the various sides and edges of the rotor blade 100. More specifically, the first shell portion 120 includes an exterior surface 124 that defines the pressure side 106 of the rotor blade 100. The second shell portion 122 includes an exterior surface 126 that defines the suction side 108 of the rotor blade 100. In the embodiment shown in FIG. 3, the first and second shell portions 120, 122 couple together such that the second shell portion 122 defines the leading edge 110 and/or the first shell portion 120 defines the trailing edge 112. In alternate embodiments, however, the first shell portion 120 may define the leading edge 110, and the second shell portion 122 may define the trailing edge 112. In further embodiments, the first and second shell portions 120, 122 may both define the leading edge 110 and the trailing edge 112.

The shell 118 defines an interior cavity 128 therein. That is, the rotor blade 100 is generally hollow. In the embodiment shown in FIG. 3, the first shell portion defines an interior surface 130 and the second shell portion 122 defines an interior surface 132. In this respect, the interior surfaces 130, 132 of the first and second shell portions 120, 122 circumscribe the interior cavity 128. Various structural components positioned in the interior cavity 128, which will be discussed in greater detail below, may divide the interior cavity 128 into various compartments.

In the embodiment shown in FIG. 3, the rotor blade 100 includes spar caps 134, 136 positioned in the interior cavity 128. In particular, a first spar cap 134 couples (e.g., adhesively) to the interior surface 130 of the first shell portion 120. A second spar cap 136 couples (e.g., adhesively) to the interior surface 132 of the second shell portion 122. In this respect, the first and second spar caps 134, 136 may generally resist bending stresses and/or other loads acting on the rotor blade 100 in a span-wise direction (i.e., a direction parallel to the span 114 of the rotor blade 100) during operation of a wind turbine 10. Furthermore, the first and second spar caps 134, 136 may resist span-wise compression of the rotor blade 100 occurring during operation of the wind turbine 10. The first and second spar caps 134, 136 may extend along the span 114 from the blade root 102 to the blade tip 104 or a portion thereof. Some embodiments of the rotor blade 100 may include zero, one, three, four, or more spar caps.

The rotor blade 100 further includes one or more shear webs 138 extending through the interior cavity 128 in the span-wise direction. In exemplary embodiments, the shear webs 138 may be formed via pultrusion. Each shear web 138 includes a first side 140 that couples to the first shell portion 120 and a second side 142 that couples to the second shell portion 122. In this respect, the shear webs 138 resist shear forces exerted on the first and second shell portions 120, 122. In the embodiment shown in FIG. 3, rotor blade 100 includes one shear web 138 directed connected (e.g., bonded) to first and second spar caps 134, 136. In alternate embodiments, however, the rotor blade 100 may include more shear webs 138 and/or the shear webs 138 may be directly connected (e.g., bonded) to the interior surfaces 130, 132 of the first and second shell portions 120, 122. In further embodiments, the shear webs 138 may extend in the chord-wise direction (i.e., a direction parallel to the chord 116 of the rotor blade 100).

Figure 4:
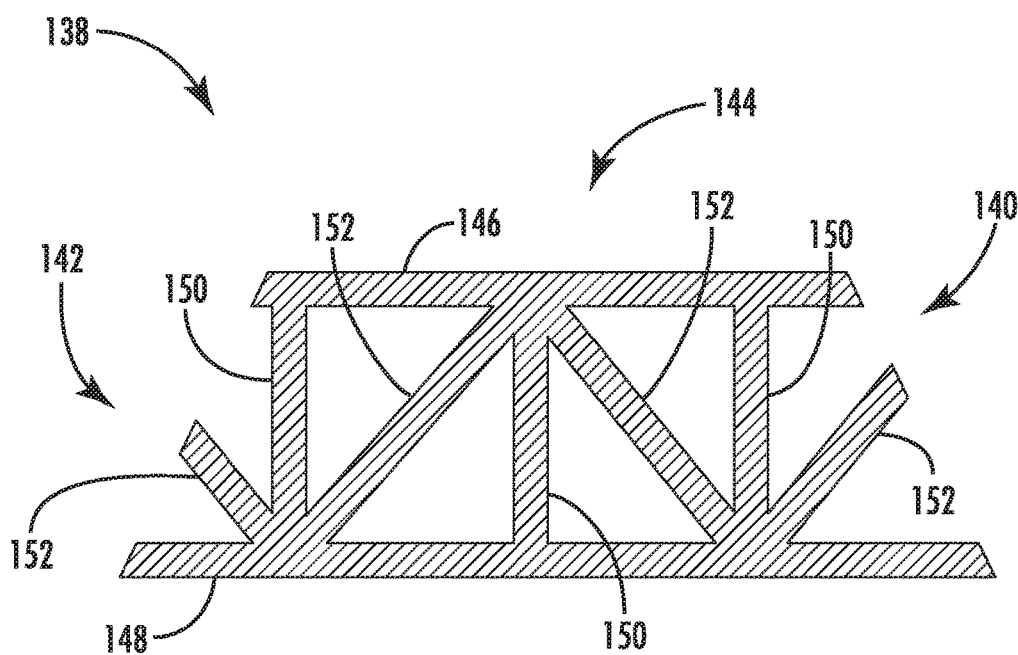
FIG. 4 is a cross-sectional view of one embodiment of the shear web in accordance with embodiments of the present disclosure.

FIG. 4 illustrates the shear web 138 in greater detail. More specifically, the shear web 138 may include a lattice structure 144, which may form the entire shear web 138 or a portion thereof. As used herein, a lattice structure is any structure that includes a periodically geometry having various interconnected walls defining a plurality of voids. In some embodiments, all of the walls of the lattice structure may have the same thickness. Furthermore, all of the voids in the lattice structure may be the same size and have the same shape in certain embodiments.

In the embodiment illustrated in FIG. 4, the lattice structure 144 is a triangular lattice structure. In this respect, the lattice structure 144 includes a first outer wall 146 spaced apart (e.g., in the chord-wise direction) from a second outer wall 148. The first and second outer walls 146, 148 extend between the first and second shell portions 120, 122 (FIG. 3) and along the span-wise direction. A plurality of perpendicular cross member walls 150 extends between (e.g., in the chord-wise direction) and couples to the first and second outer walls 146, 148. The perpendicular cross member walls 150 are evenly spaced apart between the first and second outer walls 146, 148, thereby forming a ladder-like configuration. A plurality of angular cross member walls 152 extends angularly between a junction of one of the perpendicular cross member walls 150 and one of the outer wall 146, 148 and a junction of an adjacent perpendicular cross member wall 150 and the other outer wall 146, 148. As such, the lattice structure 144 defines a plurality of triangular spaces 154 therein. In exemplary embodiments, the triangular spaces 154 are not filled with foam. In alternate embodiments, the lattice structure 144 may be a honeycomb lattice or any other suitable lattice structure.

As discussed in greater detail above, the first and second sides 140, 142 of the shear web 138 couple to the first and second shell portions 120, 122 of the rotor blade 100. As best shown in FIG. 3, the first and second shell portions 120, 122 may be curved along the chord-wise direction. In this respect, it may be necessary to cut the lattice structure 144 at the first and/or second sides 140, 142 thereof to accommodate the curvature of the first and/or second shell portions 120, 122. As such, one or more of the walls 146, 148, 150, 152 may extend outwardly at the first and/or second sides 140, 142 in a cantilever beam-like manner as shown in FIG. 4. As will be discussed in greater detail below, foam and/or end caps may be used to strengthen the first and second sides 140, 142 in such embodiments.

Figure 5:
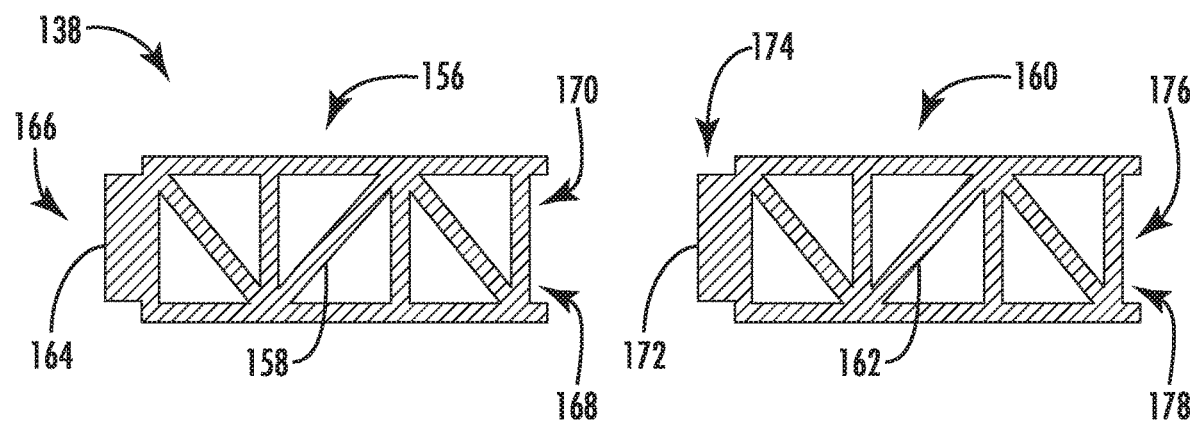
FIG. 5 is a cross-sectional view of a plurality of shear web members that couple together to form the shear web in accordance with embodiments of the present disclosure.

Referring now to FIG. 5, the shear web 138 may be formed from a plurality of shear web members. As shown, the shear web 138 may be formed from a first shear web member 156 having a first lattice structure portion 158 and a second shear web member 160 having a second lattice structure portion 162. The first shear web member 156 includes a projection 164 at a first side 166 thereof and defines a slot 168 at a second side 170 thereof. Similarly, the second shear web member 160 includes a projection 172 at a first side 174 thereof and defines a slot 176 at a second side 178 thereof. In this respect, the slot 168 defined by the first shear web member 156 receives the projection 172 of the second shear web member 160. Adhesive in the slot 168 may couple the first and second shear web members 156, 160. The projection 164 of the first shear web 156 member may be received a slot defined by another adjacent shear web member. Similarly, the slot 176 on the second shear web member 160 may receive a projection from a further adjacent shear web member. In this respect, any suitable number of shear web members may be coupled such that the shear web 138 extends between the first and second shell portions 120, 122 and along the desired portion of the span 114. In alternate embodiments, the shear web members may be coupled in any other suitable manner.

The shear web 138 and the associated lattice structure 144 may be formed from a suitable fiber reinforced polymer. In particular, the polymer may be reinforced with any suitable fiber material, including but not limited to glass fibers, carbon fibers, polymer fibers, ceramic fibers, nanofibers, metal fibers, or combinations thereof. In addition, the direction of the fibers may include biaxial, unidirectional, triaxial, or any other another suitable direction and/or combinations thereof. The fiber content may vary depending on the stiffness required in the corresponding blade component, the region, or location of the blade component in the rotor blade 100.

Furthermore, the shear web 138 and the associated lattice structure 144 may be produced using pultrusion. As used herein, the terms "pultruded," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded components is typically characterized by a continuous process of composite materials that produces composite parts having a constant cross-section. In addition, the pultruded components may be produced from rovings, which generally encompass long and narrow bundles of fibers that are not combined until joined by a cured resin. The pultruded shear web 138 and the associated lattice structure 144 may be cut to the desired shape and/or length using a water jet, a band saw, a diamond wire cutter, or any other suitable cutting device.

In alternate embodiments, the shear web 138 and the associated lattice structure 144 may be produced using additive manufacturing. As used herein, the term "additive manufacturing" refers to any process which results in a useful, three-dimensional object and includes a step of sequentially forming the shape of the object one layer at a time. Additive manufacturing processes include three-dimensional printing (3DP) processes, direct thermoplastic material placement, automated fiber placement, automated tape placement, direct fiber reinforced thermoplastic, layered UV cured, etc. A particular type of additive manufacturing process uses rapid cure materials such as PET or ABS to solidify rapidly upon placement on top of preceding layers. Exemplary additive manufacturing processes for composites typically employ thermoplastic materials in raw pellet or spool form which can be liquefied, then placed in appropriate locations as the material solidifies. Although, the shear web 138 and the associated lattice structure 144 may be produced using any suitable manufacturing method or process.

FIGS. 6-10 illustrate various embodiments for coupling the shear web 138 to the first and the second shell portions 120, 122. Nevertheless, the shear web 138 may be coupled to the first and second shell portions 120, 122 in any other suitable manner.

Figure 6:
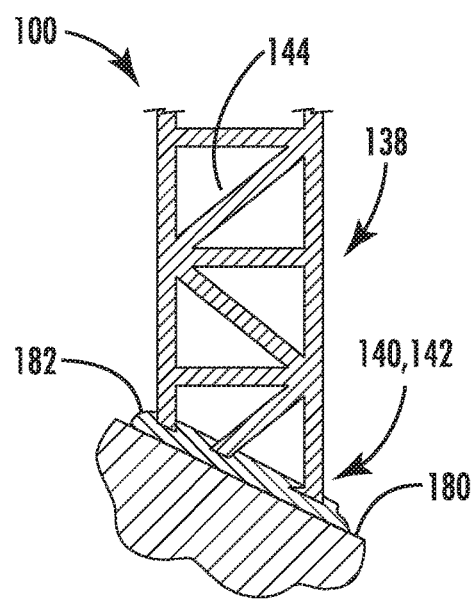
FIG. 6 is a cross-sectional view of one embodiment for coupling the shear web to a shell of the rotor blade in accordance with embodiments of the present disclosure.
Figure 7:
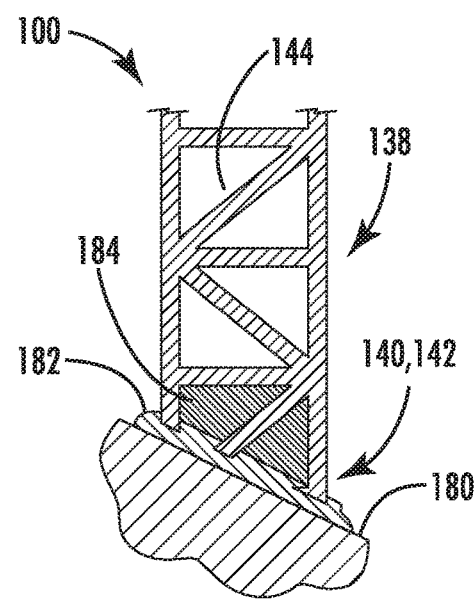
FIG. 7 is a cross-sectional view of another embodiment for coupling the shear web to the shell of the rotor blade in accordance with embodiments of the present disclosure.

More specifically, FIGS. 6 and 7 illustrate embodiments for connecting the shear web 138 directly to the first and the second spar caps 134, 136 or the first and the second shell portions 120, 122. In this respect, FIGS. 6 and 7 show the shear web 138 coupled to a substrate 180, which may be the first shell portion 120, the second shell portion 122, the first spar cap 134, or the second spar cap 136. Referring particularly to FIG. 6, the first and second sides 140, 142 of shear web 138 are bonded to the substrate 180 via an adhesive 182. In the embodiment shown in FIG. 7, the first and second sides 140, 142 of shear web 138 are bonded to the substrate 180 via the adhesive 182 as shown in FIG. 6. Nevertheless, the first and second sides 140, 142 of the shear web 138 have been filled with a foam 184 to stabilize the various walls of the lattice structure 144 acting a cantilever beam-like fashion.

Figure 8:
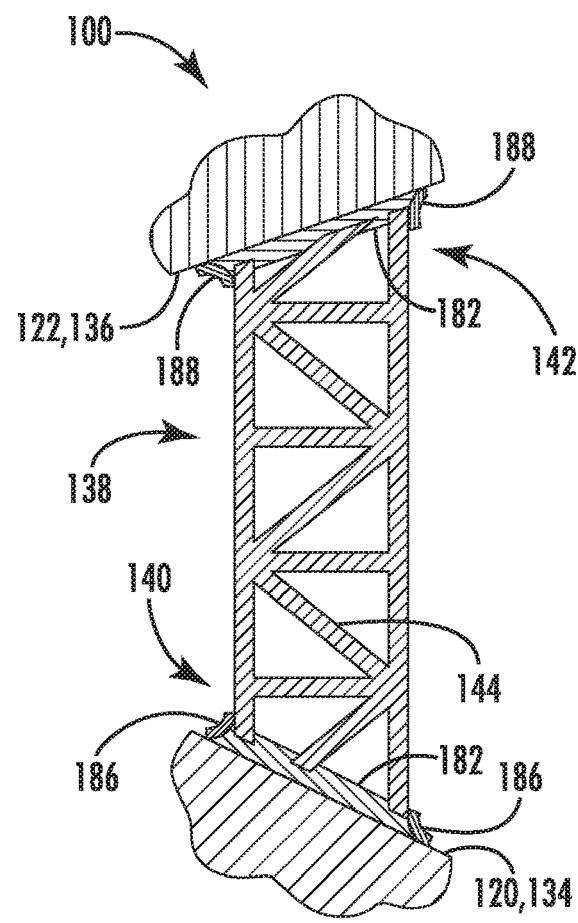
FIG. 8 is a cross-sectional view of yet another embodiment for coupling the shear web to a shell of the rotor blade in accordance with embodiments of the present disclosure.

FIG. 8 illustrates another embodiment for coupling the shear web 138 to the spar caps 134, 136 or the first and the second shell portions 120, 122 that includes one or more shear clips 186, 188. In particular, the first and second sides 140, 142 of the shear web 138 are connected to the first and the second spar caps 134, 136 or the first and the second shell portions 120, 122 via the adhesive 182. Furthermore, the adhesive 182 bonds a first shear clip 186 to the first side 140 of the shear web 138 and to the first spar cap 134 or the first shell portion 120. Similarly, the adhesive 182 bonds a second shear clip 188 to the second side 142 of the shear web 138 and to the second spar cap 136 or the second shell portion 122. The shear clips 186, 188 may resist shear forces experienced by the adhesive 182, thereby strengthening the connection between the shear web 138 and the first and the second spar caps 134, 136 or the first and the second shell portions 120, 122. Although not shown, the first and second sides 140, 142 of the shear web 138 may be filled with the foam 184 in embodiments that include the shear clips 186, 188.

Figure 9:
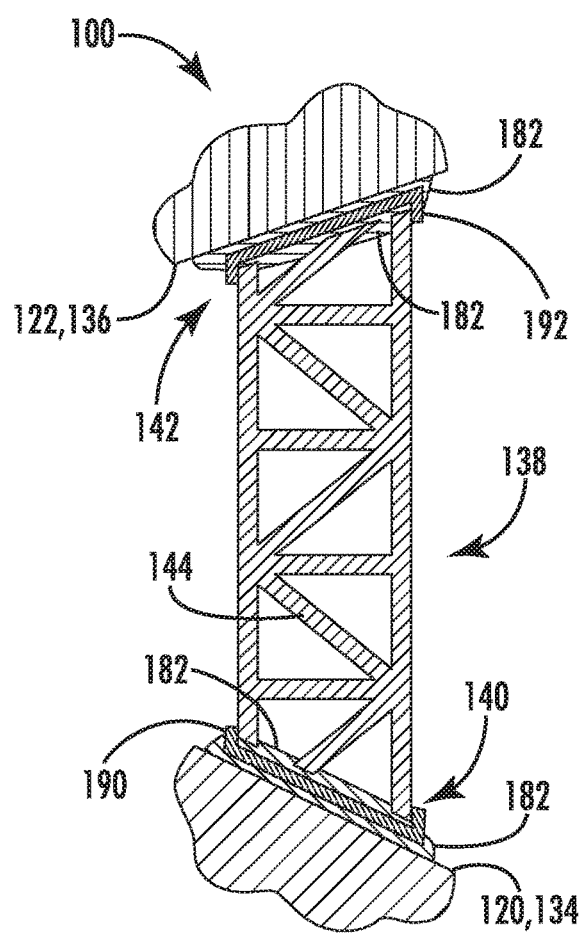
FIG. 9 is a cross-sectional view of a further embodiment for coupling the shear web to a shell of the rotor blade in accordance with embodiments of the present disclosure.

FIG. 9 illustrates a further embodiment for coupling the shear web 138 to the first and the second spar caps 134, 136 or the first and the second shell portions 120, 122 that includes one or more end caps 190, 192. More specifically, a first end cap 190 is coupled to the first side 140 of the shear web 138 via, e.g., the adhesive 182. Similarly, a second end cap 192 is coupled to the second side 142 of the shear web 138 via, e.g., the adhesive 182. The first and second end caps 190, 192 support the various walls of the lattice structure 144 acting a cantilever beam-like fashion. The first and second end caps 190, 192 may, in turn, be coupled to the first and the second spar caps 134, 136 or the first and the second shell portions 120, 122, e.g., via additional adhesive 182. In alternate embodiments, the first and second end caps 190, 192 may be coupled to the shear web 138 and the first and the second spar caps 134, 136 or the first and the second shell portions 120, 122 in any other suitable manner.

Figure 10:
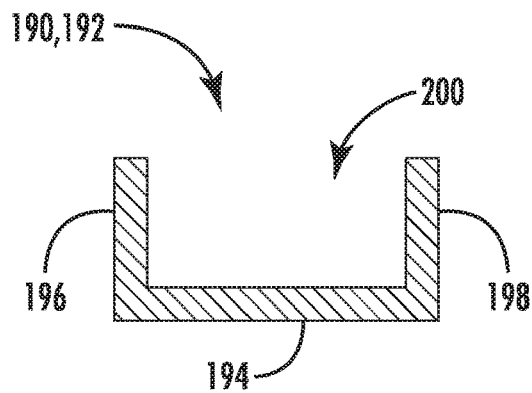
FIG. 10 is a cross-sectional view of one embodiment of an end cap in accordance with embodiments of the present disclosure.
Figure 11:
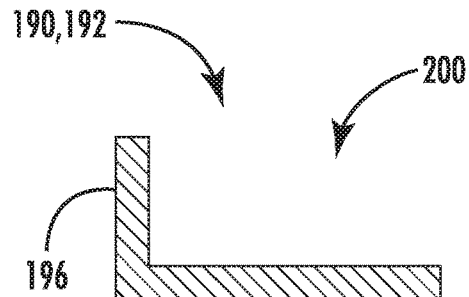
FIG. 11 is a cross-sectional view of another embodiment of the end cap in accordance with embodiments of the present disclosure.
Figure 12:
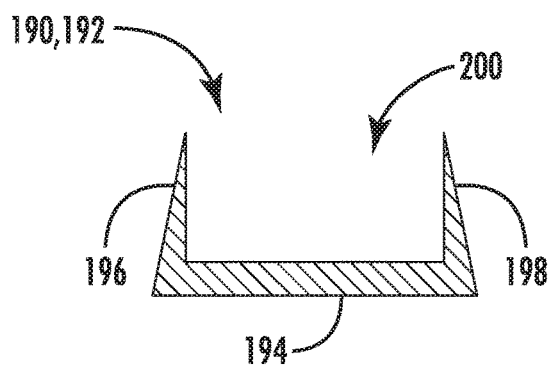
FIG. 12 is a cross-sectional view of a further embodiment of the end cap in accordance with embodiments of the present disclosure.

FIGS. 10-12 illustrate various embodiments of the end caps 190, 192. In the embodiment shown in FIG. 10, the end caps 190, 192 include a first wall 194, a second wall 196, and a third wall 198. The second and third walls 196, 198 are parallel and extend outward from the first wall 194. In this respect, the end cap 190, 192 shown in FIG. 10 has a U-shape. The first, second, and third walls 194, 196, 198 collectively define a cavity 200 that receives the first or second side 140, 142 of the shear web 138. In this respect, the first wall 194 couples to the shear web 138 and the first or second shell 120, 122, while the second and third walls 196, 198 only couple to the shear web 138. As shown, the first, second, and third walls 194, 196, 198 have rectangular cross-sections. The embodiment of the end caps 190, 192 shown in FIG. 11 includes only the first and second walls 194, 196. In this respect, the end cap 190, 192 shown in FIG. 11 has an L-shape. In the embodiment shown in FIG. 12, the end caps 190, 192 include the first, second, and third walls 194, 196, 198 like the embodiment shown in FIG. 10. Nevertheless, the second and third walls 196, 198 have a triangular cross-sectional shape. Although the second and third walls 196, 198 are shown as generally perpendicular to first wall 194 in FIGS. 10-12, the first and second walls 196, 198 may be oriented at an acute or obtuse angle relative to the first wall 194 to accommodate the curvature of rotor blade 100. Furthermore, the end caps 190, 192 may have any other suitable configuration in alternate embodiments.

Figure 13:
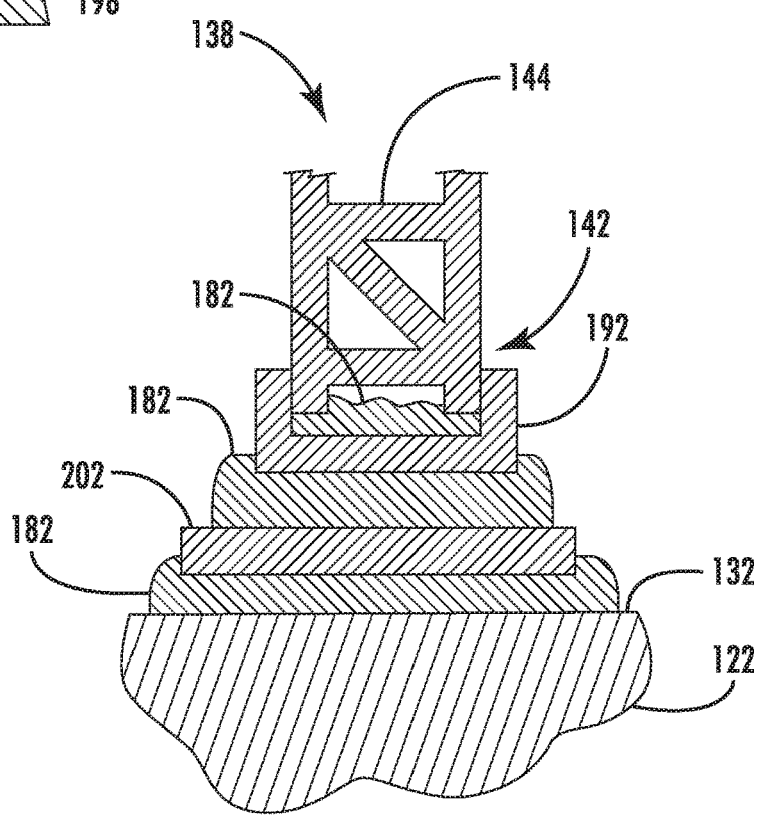
FIG. 13 is a cross-sectional view of an embodiment for coupling the shear web to a shell of the rotor blade using one or more spacers in accordance with embodiments of the present disclosure.

Referring now to FIG. 13, one or more spacers 202 may be used when coupling the shear web 138 to the first and the second spar caps 134, 136 or the first and the second shell portions 120, 122. More specifically, the first side 140 of the shear web 138 is coupled to the first spar cap 134 or the first shell portion 120 using the first end cap 190 and the adhesive 182 as described above in the context of FIG. 9. The adhesive 182 coupling the first side 140 of the shear web 138 and the first spar cap 134 or the first shell portion 120 is then cured. Similarly, the second end cap 192 couples to the spar cap 136 or the second side 122 of the shear web 138 via the adhesive 182. The spacer 202 is coupled to the interior surface 132 of the second shell portion 122 via additional adhesive 182. Further adhesive 182 is placed on the spacer 202. The first and second shell portions 120, 122 are then joined or otherwise coupled such that the second end cap 192 contacts the adhesive 182 on the spacer 202. In this respect, the adhesive 182 couples the second side 142 of the shear web 138, the second end cap 192, the spacer 202, and the second spar cap 136 or the second shell portion 122 together once the first and second shell portions 120, 122 are joined. The adhesive 182 in contact with the spacer 202 is uncured when joining the first and second shell portions 120, 122. In this respect, the use of the spacer 202 may eliminate the need to dry fit the shear web 138 with first and second shell portions 120, 122 before coupling. That is, the spacer 202 may be used to fill gaps between the shear web 138 and the first and/or second shell portions 120, 122. In alternate embodiments, the shear web 138 may be coupled to second shell portion 122 via cured adhesive 182 before joining the first and second shell portion 120, 122.

As discussed in greater detail above, the shear web of the rotor blade 100 is formed partially or entirely of the lattice structure 144. The incorporation of the lattice structure 144 in the shear web 138 reduces the time necessary to manufacture the shear web 138 relative to conventional shear webs. As such, the cost of manufacturing the shear web 138 and the rotor blade 100 is reduced compared to conventional shear webs and rotor blades.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A rotor blade, comprising:
a shell defining an interior cavity and comprising exterior surfaces defining a pressure side, a suction side, a leading edge, and a trailing edge each extending between a tip and a root, the shell defining a span and a chord;
a spar cap coupled the shell;
a shear web positioned in the interior cavity and coupled to the shell; and
an end cap coupled to the spar cap and an end of the shear web, the end cap including an end cap wall positioned between the end of the shear web and the spar cap,
wherein the shear web comprises a lattice structure including a first wall, a second wall extending outwardly from the first wall and coupled to the end cap, and a third wall extending outwardly from the first wall and coupled to the end cap, and
wherein the first wall, the second wall, the third wall, and the first end cap collectively define a cavity filled with a foam.

2. The rotor blade of claim 1, wherein the shear web comprises a first shear web member coupled to a second shear web member, the first shear web member comprising a first lattice structure and the second shear web member comprising a second lattice structure.

3. The rotor blade of claim 2, wherein the first shear web member comprises a projection, and the second shear web member comprises a slot for receiving the projection of the first shear web.

4. The rotor blade of claim 1, wherein the shell comprises a first shell portion defining the pressure side and a second shell portion defining the suction side, the first shell portion coupled to the second shell portion, and wherein a first side of the shear web is coupled to the first shell portion and a second side of the shear web is coupled to the second shell portion.

5. The rotor blade of claim 1, wherein the end cap corresponds to a first end cap coupled to a first side of the shear web and a portion of the shell defining the pressure side, the rotor blade further comprising:
a second end cap coupled to a second side of the shear web and a portion of the shell defining the suction side.

6. The rotor blade of claim 1, wherein the lattice structure comprises a triangular lattice pattern.

7. The rotor blade of claim 1, wherein the lattice structure is formed from a fiber reinforced polymer material.

8. A rotor blade, comprising:
a shell defining an interior cavity and comprising exterior surfaces defining a pressure side, a suction side, a leading edge, and a trailing edge each extending between a tip and a root, the shell defining a span and a chord;
a first spar cap coupled a portion of the shell defining the pressure side;
a second spar cap coupled a portion of the shell defining the suction side;
a shear web positioned in the interior cavity, the shear web comprising a first side;
a first end cap coupled to the first spar cap and a first end of the shear web, the first end cap including an end cap wall positioned between the first end of the shear web and the first spar cap; and
a second end cap coupled to the second spar cap and a second end of the shear web, the second end cap including an end cap wall positioned between the second end of the shear web and the second spar cap,
wherein the shear web comprises a lattice structure including a first wall, a second wall extending outwardly from the first wall and coupled to the first end cap, and a third wall extending outwardly from the first wall and coupled to the first end cap, and
wherein the first wall, the second wall, the third wall, and first end cap collectively define a cavity filled with a foam.

9. The rotor blade of claim 8, wherein the first side of the shear web is bonded to the first end cap and the second side of the shear web is bonded to the second end cap.

10. The rotor blade of claim 8, further comprising:
a spacer positioned between the first end cap and the first spar cap or between the second end cap and the second spar cap.

11. The rotor blade of claim 8, wherein the end cap wall of the first end cap corresponds to a first end cap wall of the first end cap and the end cap wall of the second end cap corresponds to a first end cap wall of the second end cap and at least one of the first end cap and the second end cap comprises:
a second end cap wall extending outward from the first end cap wall of the corresponding first end cap or second end cap and coupled to the shear web.

12. The rotor blade of claim 11, wherein at least one of the first end cap and the second end cap comprises a third end cap wall extending outward from the first end cap wall of the corresponding first end cap or second end cap and coupled to the shear web, the third end cap wall being spaced apart from the second end cap wall of the corresponding first end cap or second end cap.

13. The rotor blade of claim 12, wherein at least one of the second end cap wall and the third end cap wall comprises a triangular cross-section.

14. A wind turbine, comprising:
a tower;
a nacelle mounted on the tower;
a rotor coupled to the nacelle, the rotor comprising a hub and at least one rotor blade extending outward from the hub, each rotor blade comprising:
a shell defining an interior cavity and comprising exterior surfaces defining a pressure side, a suction side, a leading edge, and a trailing edge each extending between a tip and a root, the shell defining a span and a chord;
a spar cap coupled the shell;
a shear web positioned in the interior cavity and coupled to the shell; and
an end cap coupled to the spar cap and an end of the shear web, the end cap including an end cap wall positioned between the end of the shear web and the spar cap,
wherein the shear web comprises a lattice structure including a first wall, a second wall extending outwardly from the first wall and coupled to the first wall, and a third wall extending outwardly from the first wall and coupled to the first wall, and
wherein the first wall, the second wall, the third wall, and the end cap collectively define a cavity filled with a foam.

15. The wind turbine of claim 14, wherein the shear web comprises a first shear web member coupled to a second shear web member, the first shear web member comprising a first lattice structure and the second shear web member comprising a second lattice structure.

16. The wind turbine of claim 14, wherein the end cap corresponds to a first end cap coupled to a first side of the shear web and a portion of the shell defining the pressure side, the wind turbine further comprising:
   a second cap coupled to a second side of the shear web and to a portion of the shell defining the suction side.

17. The wind turbine of claim 16, wherein the end cap wall of the first end cap corresponds to a first end cap wall of the first end cap and the end cap wall of the second end cap corresponds to a first end cap wall of the second end cap and at least one of the first end cap and the second end cap comprises:
   a second end cap wall extending perpendicularly outward from the first end cap wall of the corresponding first end cap or second end cap and coupled to the shear web.

\* \* \* \* \*